Sept. 6, 1955 C. A. RAMSEL 2,717,067
CLUTCH ENGAGING MECHANISM
Filed July 3, 1953 3 Sheets-Sheet 3
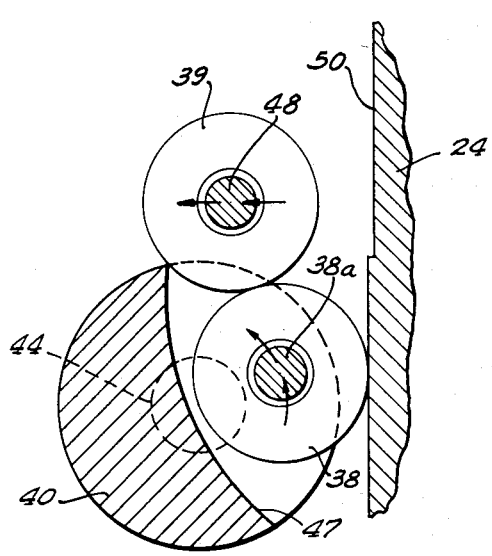
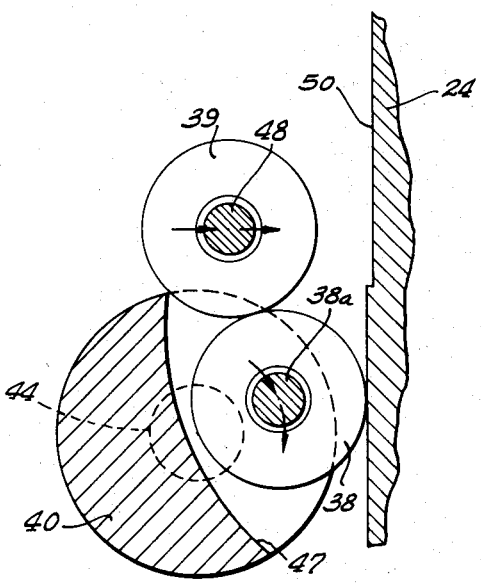
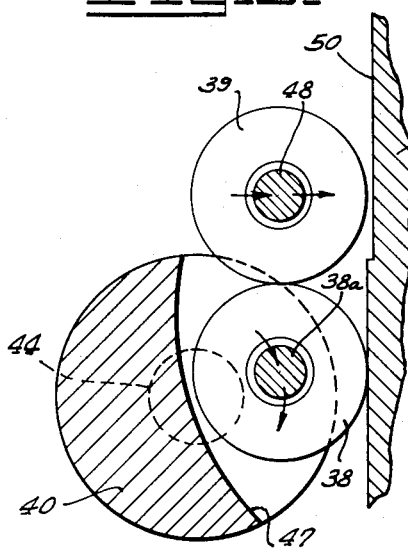
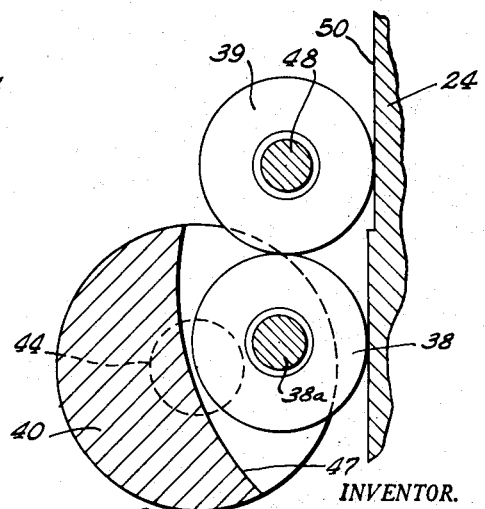
INVENTOR.
Charles A. Ramsel
BY
Charles M. Fryer
Attorney United States Patent Office 2,717,067
Patented Sept. 6, 1955

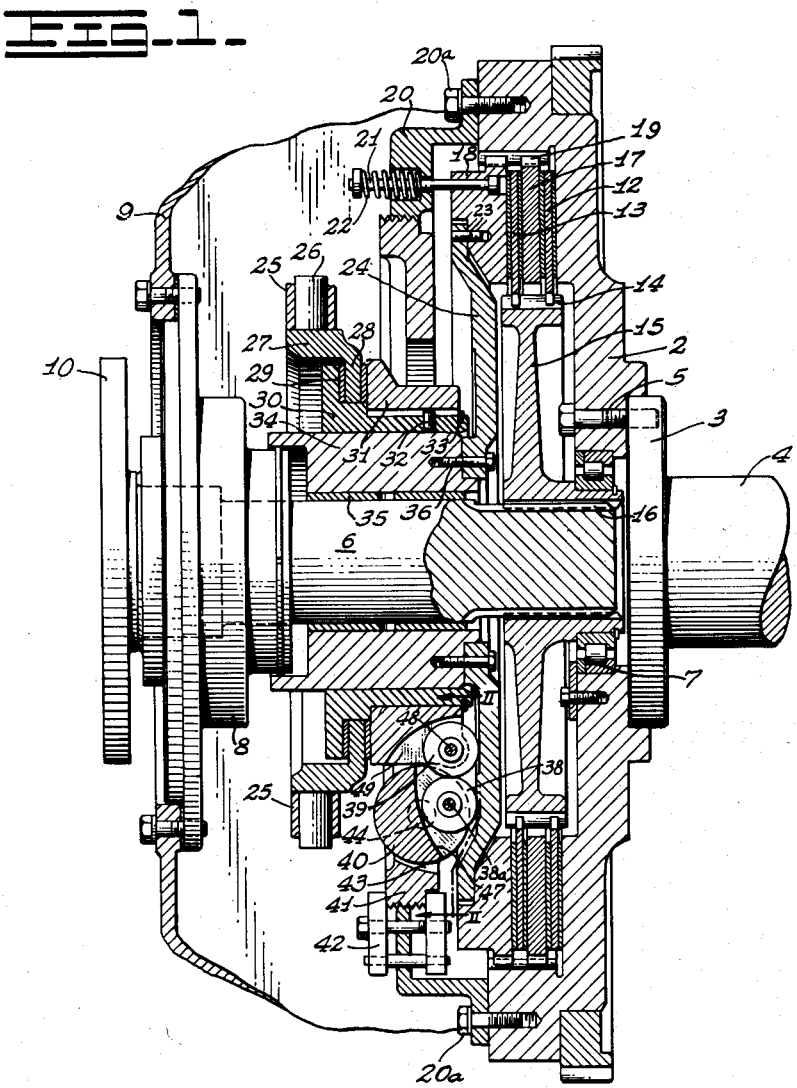

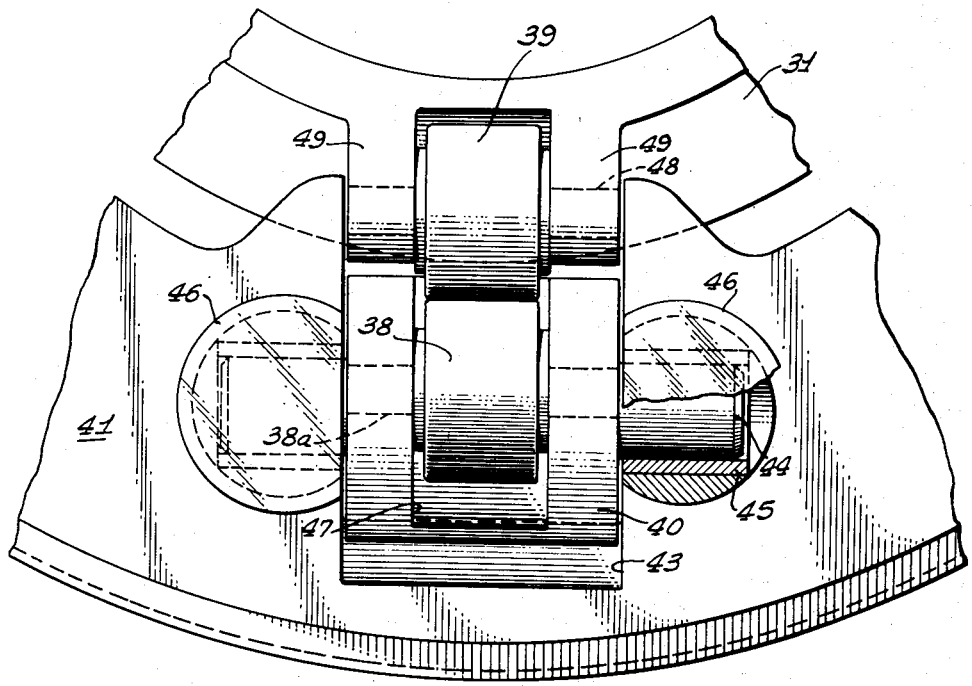

2,717,067

CLUTCH ENGAGING MECHANISM

Charles A. Ramsel, Peoria, Ill., assignor to Caterpillar Tractor Co., Peoria, Ill., a corporation of California Application July 3, 1953, Serial No. 365,878

7 Claims. (Cl. 192—93)

This invention relates to clutches and particularly to the engaging and disengaging mechanism of disc-type clutches of the kind generally employed between the engine and transmission of a tractor or similar vehicle. It is common practice in connection with such clutches to use a cam or wedge-like action in applying the pressure required for clutch engagement. However since there are a plurality of clutch engaging parts spaced about the periphery of the clutch pressure plate, a high degree of precision is required in the manufacture of these parts to insure equal pressure at all points. Furthermore where a wedge-like action is employed, it is often difficult to insure disengagement of the clutch and the wear on engaging parts of the clutch is often excessive.

It is the object of the present invention to provide an improved clutch engaging mechanism wherein the above disadvantages are overcome and also to provide a clutch engaging mechanism wherein the essential moving parts are all circular or roller-like in form so that precision in manufacture is relatively easily accomplished.

A further object of the invention is to provide a clutch engaging mechanism where firm positive engagement is insured and wherein quick disengagement is obtained when required.

A still further object of the invention is to provide a clutch engaging mechanism including a centrifugally actuated counterweight operable in the engaged position of the clutch to prevent accidental disengagement and operable in disengaged position of the clutch to prevent accidental engagement.

Further and more specific objects and advantages of the invention are made apparent in the following specification wherein the invention is described in detail by reference to the accompanying drawings.

In the drawings:

Fig. 1 is a central section through an engine flywheel and clutch including the clutch engaging mechanism of the present invention, Fig. 2 is an enlarged detail of a portion of the engaging mechanism shown in Fig. 1 as viewed from the line II—II in Fig. 1, and Figs. 3 to 6, inclusive, are schematic views illustrating the relative positions of several parts of the clutch engaging mechanism as they are moved from fully disengaged to fully engaged position.

The general arrangement of a clutch of a type frequently associated with an internal combustion engine is illustrated.

In Fig. 1 of the drawings, a flywheel 2 is shown as secured to a flange 3 of an engine crankshaft 4 by means of cap screws, one of which is illustrated at 5. A driven shaft to which power is transmitted by the clutch is illustrated at 6 as having one end journaled in a bearing 7 disposed in a centrally located recess in the flywheel and also as being supported in a bearing, not shown, disposed within a housing 8 which is secured to the main clutch housing, a portion of which is shown at 9. The extending end of the driven shaft 6 is flanged as illustrated at 10 for convenience in making a connection with the mechanism to be driven such as a vehicle transmission or the like not shown.

The flywheel 2 is of hollow or cupped construction and contains the major portions of the clutch. Typical clutch parts carried within the flywheel are illustrated as a pair of driven discs 12 and 13 which have the usual toothed connection with the gear-like periphery 14 of a hub member 15 splined as indicated at 16 to the end of the driven shaft 6. An intermediate pressure plate 17 is disposed between the discs 12 and 13 and a main pressure plate 18 is disposed on the outer side of the disc 13 and both of these pressure plates are slidably but non-rotatably keyed as at 19 to a ring of internal teeth contained by the flywheel. As in conventional clutch constructions, pressure against the main pressure plate 18 inwardly or toward the right, as viewed in Fig. 1, brings the pressure plates and clutch discs into frictional contact which imparts a drive from the flywheel through the hub member 15 and to the driven shaft 6. An annular flange part shown at 20 is secured to the flywheel as by cap screws 20a and carries a plurality of retracting devices for normally holding the clutch in disengaged position. One of these devices is shown as a pin 21 extended through the pressure plate 18 and having a spring 22 normally tending to expand and urge the plate 18 toward the left or toward its clutch release position.

Supported by the main pressure plate 18 and secured against relative rotation with respect thereto by a pin 23 is an annular plate or a pressure ring 24. It is by urging the pressure ring 24 inwardly or toward the right that the clutch is engaged. This is usually accomplished by means of a hand actuated lever or the like which operates through a yoke and a clutch throwout bearing or collar. In the present instance, a portion of the yoke is illustrated at 25 as embracing pins 26 diametrically disposed on a collar 27 which has a flange 28 embraced in an annular clutch throwout bearing 29. This bearing 29 is formed in a two-part sliding collar 30, the second part 31 of which is held against rotation thereon as by a pin and slot connection illustrated at 32. A snap ring 33 serves to hold the part 31 against axial displacement. The collar slides on a hub 34 which is rotatable with respect to the driven shaft 6 through the medium of a bearing 35 and the hub is secured as by cap screws 36 to the pressure ring 24.

The present invention resides principally in the means acting between the sliding collar 30—31 and the pressure ring 24 for effecting engagement and disengagement of the clutch as the sliding collar moves inwardly and outwardly respectively. This engagement and disengagement is accomplished by a plurality of clutch engaging rollers 38 and actuating rollers 39 operating in conjunction with counterweights 40. One set of such rollers and counterweights is illustrated in Figs. 1 and 2 though it is to be understood that a plurality, preferably three or more, of such sets are employed in equal circumferential spacing. The counterweights 40 are carried by an adjusting ring 41 supported by a threaded engagement with the internal diameter of the annular flange part 20. This enables the ring to be advanced inwardly and outwardly to adjust the action of the clutch and compensate for wear which takes place between the discs and pressure plates. In operation, the adjusting ring is held against rotation at its threaded connection by means of a clamping device such as indicated at 42. The adjusting ring 41 is provided with spaced inwardly opening notches 43. One of the counterweights 40 is disposed in each of the notches 43 and supported for rocking movement on trunnions 44, best illustrated in Fig. 2, journaled in bearing 45. The bearings 45 are disposed in pins 46 which pins are pressed into suitable openings in the ring 41 contiguous to the opposite edges of the notch 43 to facilitate assembly.

Each counterweight 40 has a recess 47 formed therein to receive one of the actuating rollers 38. Each roller 38 is carried on a bearing pin 38a which extends through the counterweight itself. Since the axis of the roller 38 is eccentric with relation to the counterweight, the roller moves in an arcuate path as the counterweight swings about its own trunnion 44. Each of the actuating rollers 39 is journaled on a pin 48 supported in spaced ears 49 which extend outwardly from the periphery of the sliding collar part 31. As best illustrated in Fig. 2, the ears 49 project into the notch 43 in the adjusting ring 41 to prevent relative rotation of these parts and to maintain the rollers 38 and 39 in alinement with each other.

In operation, when the clutch control lever is actuated to move the yoke 25, shown in Fig. 1 toward the right, to engage the clutch, the sliding collar 30—31 is moved to the right carrying with it the rollers 39. The position of these rollers before such clutch engaging movement is illustrated schematically in Fig. 3. The initial portion of this movement to the right is indicated in Fig. 4 where arrows show the direction of movement and show the roller 39 bearing upon the roller 38 to swing it downwardly in an arc about the axis of the counterweight 40. Continued movement of the roller 39 toward the right as indicated in Fig. 5 brings it directly above the roller 38 where it exerts the maximum pressure thereon and where the roller 38 urges the pressure ring 24 toward the right and into its clutch engaging position. Upon still further movement toward the right of the roller 39 it passes the center of the roller 38 and comes to rest against the pressure ring 24 which defines the limit of its movement. However since it has moved beyond a vertical plane intercepting the center line of the roller 38 an over-center or locking position has been attained which prevents the return of the roller 39 except under the application of external force. In order to permit this overcenter position of the roller 39 the pressure ring 24 has a cutaway or relieved surface as shown at 50. This same effect might be accomplished by making the roller 39 slightly smaller in diameter than the roller 38 but the relieving of the surface as indicated at 50 on the pressure ring is more economical and prevents confusion of assembly where rollers of two slightly different sizes are used.

As thus far described, the counterweight 40 serves as a lever supporting the roller 38 for swinging movement. However this counterweight which is in effect pivotally supported on its own trunnions 44 has a center of gravity disposed to urge the counterweight alternately in opposite directions as it swings back and forth about its trunnion. In other words when the counterweight is in the position illustrated in Fig. 3 and the clutch is in its disengaged position, the center of gravity on the counterweight is slightly toward the left of its axial center so that the centrifugal action of the driving parts of the clutch tend to swing the counterweight in a counter-clockwise direction thus insuring that the clutch will remain in a disengaged position. On the other hand, when the parts have been moved to the position illustrated in Fig. 6, the center of gravity of the counterweight has passed a plane which intersects the axes of all of the trunnions 44. In this event centrifugal action tends to turn the counterweight in a clockwise direction and thus to augment the other forces which tend to hold the clutch in its engaged position.

When the rollers 39 are moved toward the left, they pass the center line of the rollers 38 and permit disengagement of the clutch by the springs 22 shown in Fig. 1. However if by any chance the rollers 38 do not swing freely about the axes of the counterweights 40 to permit this disengaging movement, the continued movement of each roller 39 toward the left causes it to strike a portion of its counterweight as shown in Fig. 3. Consequently the counterweight is forcibly rocked in a counter-clockwise direction and swings the roller 38 out of its engaged position. Under these circumstances the springs 22 become effective and the center of gravity of the counterweight having passed the effective plane also acts to retain the clutch in its disengaged position.

I claim:

1. In a disc-type clutch which includes a pressure member moveable toward the clutch discs to impart clutch engaging pressure, engaging rollers, means supporting the engaging rollers to swing arcuately against the pressure member, an actuating roller for each of said engaging rollers, and means to move said actuating rollers in contact with the engaging rollers to swing the engaging rollers through their arcuate courses.

2. In a disc-type clutch which includes a pressure member moveable toward the clutch discs to impart clutch engaging pressure, engaging rollers, means supporting the engaging rollers to swing arcuately against the pressure member, an actuating roller for each of said engaging rollers, and means to move said actuating rollers in contact with the engaging rollers to swing the engaging rollers through their arcuate courses, said actuating rollers being supported to occupy over center positions relative to the engaging rollers for holding the clutch in its engaged position.

3. In a disc-type clutch which includes a pressure member moveable toward the clutch discs to impart clutch engaging pressure, engaging rollers, means supporting the engaging rollers to swing arcuately against the pressure member, an actuating roller for each of said engaging rollers, means to move said actuating rollers in contact with the engaging rollers to swing the engaging rollers through their arcuate courses, said actuating rollers being supported to occupy over center positions relative to the engaging rollers for holding the clutch in its engaged position, and counterweights associated with the engaging rollers and balanced to urge them in opposite directions as they swing between engaging and disengaging positions.

4. In a clutch which includes friction discs interposed between a driving shaft and a driven shaft, a pressure ring rotatable with the driving shaft and moveable toward the discs to impart clutch engaging pressure to them, and a collar slidable axially of the driven shaft, clutch engaging rollers supported for arcuate movement in engagement with the pressure ring to move it toward the discs, and actuating rollers carried by said collar and in contact with the engaging rollers to urge them toward the pressure ring when the collar slides toward it.

5. In a clutch which includes friction discs interposed between a driving shaft and a driven shaft, a pressure ring rotatable with the driving shaft and moveable toward the discs to impart clutch engaging pressure to them, and a collar slidable axially of the driven shaft, counterweights pivotally supported on means rotatable with the pressure ring, clutch engaging rollers rotatably and eccentrically carried by the counterweights, actuating rollers rotatably carried by the sliding collar and in contact with the engaging rollers in positions to swing the engaging rollers against the pressure ring to urge the latter to clutch engaging position when the collar slides toward the ring.

6. In a clutch which includes friction discs interposed between a driving shaft and a driven shaft, a pressure ring rotatable with the driving shaft and moveable toward the discs to impart clutch engaging pressure to them, and a collar slidable axially of the driven shaft, counterweights pivotally supported on means rotatable with the pressure ring, clutch engaging rollers rotatably and eccentrically carried by the counterweights, actuating rollers rotatably carried by the sliding collar and in contact with the engaging rollers in positions to swing the engaging rollers against the pressure ring to urge the latter to clutch engaging position when the collar slides toward the ring, said counterweights being balanced to urge the engaging rollers in opposite directions as they swing between engaging and disengaging positions.

7. In a clutch which includes friction discs interposed between a driving shaft and a driven shaft, a pressure ring rotatable with the driving shaft and moveable toward the discs to impart clutch engaging pressure to them, and a collar slidable axially of the driven shaft, counterweights pivotally supported on means rotatable with the pressure ring, clutch engaging rollers rotatably and eccentrically carried by the counterweights, actuating rollers rotatably carried by the sliding collar and in contact with the engaging rollers in positions to swing the engaging rollers against the pressure ring to urge the latter to clutch engaging position when the collar slides toward the ring, said counterweights being balanced to urge the engaging rollers in opposite directions as they swing between engaging and disengaging positions, and said actuating rollers being positioned to engage the counterweights as the collar is moved away from the ring to swing them about their pivots and insure positive disengaging action.

References Cited in the file of this patent

UNITED STATES PATENTS

| | | |
|---|---|---|
| 1,233,561 | Dornfeld | July 17, 1917 |
| 1,745,079 | Conway | Jan. 28, 1930 |
| 2,279,700 | Adamson | Apr. 14, 1942 |
| 2,392,984 | Gerst | Jan. 15, 1946 |